Aug. 8, 1972  E. PETIX  3,682,705
REPLACEABLE ELECTROCHEMICAL CELL MODULE
Filed June 11, 1970
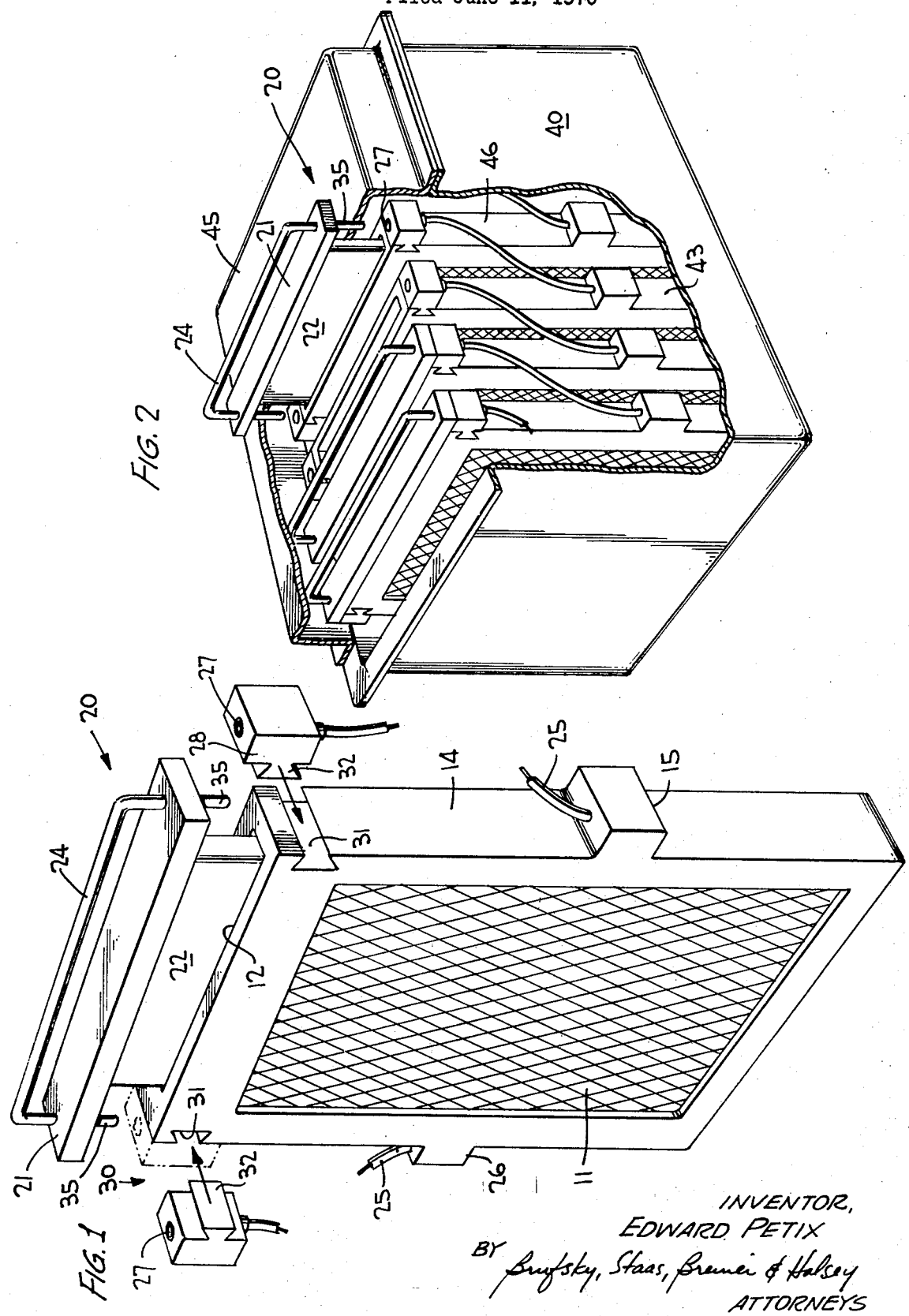
INVENTOR,
EDWARD PETIX
BY Bruysky, Staas, Bremer & Halsey
ATTORNEYS

United States Patent Office 3,682,705
Patented Aug. 8, 1972

3,682,705
REPLACEABLE ELECTROCHEMICAL
CELL MODULE
Edward Petix, 16 Searington Drive, Syosset, N.Y. 11791
Filed June 11, 1970, Ser. No. 45,401
Int. Cl. H01m 27/00
U.S. Cl. 136—86 R 6 Claims

ABSTRACT OF THE DISCLOSURE

A lightweight metal/air or metal/oxygen cell is described in which a consumable anode is inserted in and is removable from a cell module comprising an envelope cathode having a pocket for receiving the anode, and a non-conductive frame in which the cathode is mounted. The cell module is provided with an electrical wiring system such that contemporaneously with the replacement of the anode the proper electrical connections are made externally of the cell. The replaceable anode has an associated gripping member which supports an electrical connector constructed and arranged to mate with an electrical connector mounted on the cell module.

These connectors are themselves electrically connected to the appropriate electrodes to establish, when mated, the desired connections for battery operation. The electrical connector mounted on the cell module is readily detachable therefrom, without need for special tools and without destroying any physical characteristic of the cell module, to permit rapid replacement of a single defective cell module in a string of cells used in a battery configuration.

FIELD OF THE INVENTION

The present invention relates to improved electrochemical cells for the generation of electrical current, and more particularly, to an improved construction for interconnecting a plurality of such cells.

DESCRIPTION OF THE PRIOR ART AND BACKGROUND

In the commonly assigned United States Patent 3,436,270 to Oswin entitled "Oxygen Depolarized Cell and Method of Producing Electricity Therewith," Apr. 1, 1969, there is disclosed an improved metal/air or metal/oxygen depolarized cell which comprises a bi-cathode, or envelope cathode, an anode, an electrolyte between the anode and cathode, and means retaining the anode and the cathode in operable relationship. The cathode is composed of a hydrophobic polymer membrane, such as polytetrafluoroethylene (PTFE), which is permeable to gases but impermeable to aqueous liquid, with a catalytic layer thereon in contact with the electrolyte of the cell. The anode is replaceable, and comprises a sheet of porous or solid metal which is positioned within the pocket of the envelope cathode and separated therefrom by the electrolyte. The electrolyte is conveniently trapped in a suitable matrix, such as a regenerated cellulose paper, and the anode and cathode are held in operable association by the use of clamps, for example.

In operation of the cell, air or oxygen passes through the polymer membrane, ionizes at the catalytic layer, accepting electrons, and forming hydroxyl ions which are transferred to the anode to complete the electrical reaction. When the anode is completely or substantially completely oxidized it may be readily replaced by simply withdrawing it from the pocket of the cathode and inserting a fresh anode in its place. The cathode remains unchanged as a result of the electrochemical reaction and does not require any separate recharging step. New electrolyte may be furnished to the cell at the time the anode is replaced by saturating the fresh anode, if porous, or by saturating the aforementioned matrix (e.g., a hydrophilic membrane) about the anode.

Typically, a plurality of such cells are stacked in juxtaposed relationship to form a battery. The cells are retained within a case, usually under pressure exerted perpendicularly to the plane of each cell by a pressure plate and screw drive mechanism operable externally of the case. Appropriate terminals are provided at the exterior of the case and are electrically connected to the stacked cells to withdraw electrical power therefrom.

The commonly assigned Rosansky et al. application Ser. No. 614,685, now U.S. Patent No. 3,513,030, discloses a wiring system for cells in such a stacked configuration by which the cells are serially connected to one another through electrical leads each of which is substantially permanently secured, physically, to a respective cell and to the next adjacent cell in the stack. In particular, according to the Rosansky et al. application, each lead is electrically connected at one end to the cathode of a respective cell and at the other end to a female connector (i.e., receptacle or jack) secured to the immediately adjacent cell. At the cathode-connected end, the lead extends through an opening in one edge of the non-conductive frame of the cell and is physically attached to that edge by suitable means, such as epoxy resin, which also serves to seal the opening. At the receptacle-connected end, the receptacle is embedded in one edge of the frame of the cell, as by molding the receptacle in place or by use of epoxy resin, in such a manner as to expose its mouth at the same surface of the frame at which the pocket in the envelope cathode is exposed.

The replaceable anode is fastened to an insulative gripping member which may also have an attached handle, to facilitate insertion and removal of the anode. This gripping member bottoms against the upper surface of the cathode frame, at which the pocket is exposed, when the anode is fully inserted into the pocket. Conveniently, also according to the aforesaid Rosansky et al. application, a male connector (i.e., a prong or plug) is secured in the gripping member to project from the same surface thereof as does the anode, and parallel thereto. This prong is electrically connected to the anode. The arrangement is such that as the anode is inserted into the pocket, the prong is aligned with the receptacle and automatically mates therewith when the anode is fully inserted. Thus, insertion of the anode in place in the cell module is effective to concurrently establish electrical connection from that anode to the cathode of the next adjacent cell, and removal of the anode is effective to concurrently break that electrical connection. Such an arrangement is clearly desirable because it requires no additional steps to the replacement of an oxidized anode in order to effect and to assure a continuing electrical output from the battery.

However, a problem arises when replacement of a single defective cell among the stacked cells becomes necessary, particularly in the field. The physical connection of all cells of the battery by permanently secured electrical leads requires that the entire battery be replaced when a single cell is defective or that a makeshift replacement of the defective cell be effected as by splicing wires together after removing the bad cell.

The provision of a free connector which is attached to an electrical lead from one of the electrodes and which is to be plugged into or to accept a connector attached to an electrical lead from the other electrode solves a part of the problem but creates further problems. For example, the desired electrical connection must now be made independently of the replacement of the anode, i.e., as a distinct step. Moreover, since it is desirable to provide a redundant wiring system, as is pointed out in the aforesaid Rosansky et al. application, wherein duplicate leads and connections are employed to virtually eliminate the loss of power as a consequence of a loose or broken connection, still more extra-replacement of anode steps must be undertaken to replace a defective cell.

OBJECTS OF THE INVENTION

Accordingly, it is a principal object of the present invention to provide improvements in intercell connection of electrochemical cells, generally of the type described above, to permit ease of replacement of one or more defective cells.

Another object of the invention is to provide electrical connecting means for flat electrochemical cells by which to permit rapid assembly of the cells in stacked, electrically cooperating relationship in a battery configuration.

Still another object of the invention is to provide electrochemical cell connectors which are readily replaceable, either because of a defect or because of obsolescence, without need for disposing of an entire cell module.

Yet another object of the present invention is the provision of electrical connector means for electrochemical cells of the consumable anode type, in which replacement of the anode contemporaneously results in establishing proper external electrical connections for the cell.

SUMMARY OF THE INVENTION

Briefly, the above and other objects of the present invention are achieved by use of an electrical connector which includes a flexible electrical lead and which is mounted to a non-conductive frame of a cell module but is detachable at will therefrom. The connector may be male or female, preferably the latter, and is arranged, when mounted in position on the frame, to make connection with a mating electrical connector which is conductively attached to a replaceable anode, where a series connection between cells is desired. The mating electrical connector is supported on a common support member with the anode, and its position relative to the anode is physically fixed.

In a preferred embodiment of the invention, a part of the nonconductive body portion of the electrical connector is constructed and arranged to mechanically connect with a portion of the cell frame to constitute a dovetail configuration. Either the body portion of the connector or the connecting portion of the frame member may comprise a mortise, in which case the other element comprises a tenon which is to be received within the mortise to form the dovetail joint. The tenon is readily separable from the mortise whenever it is necessary or desirable to replace a cell module. In removing a cell module, the replaceable anode is first withdrawn from the module, thereby separating the electrical connectors, and the frame-mounted (i.e., cathode-coupled) connector is then detached from the frame.

THE DRAWINGS

The improved construction of the cell of the present invention will more readily become apparent from a consideration of the following detailed description of a preferred embodiment, when taken in conjunction with the accompanying drawings, wherein like reference numerals are utilized throughout to designate like parts, and wherein:

FIG. 1 is an exploded perspective view of one embodiment of an electrochemical cell in which the preferred embodiment of the invention may be utilized, showing the manner of interconnection of the cells using the connector; and FIG. 2 is a perspective view of a battery partially broken away to expose a plurality of cells and connectors of the type shown in FIG. 1, electrically connected in stacked configuration.

DETAILED DESCRIPTION OF THE PREFERRED EMBODIMENT

With reference now to the drawings, an exemplary electrochemical cell module with which the present invention may be utilized includes an envelope cathode 11 mounted in a non-conductive bi-cell frame 14. The frame 14 may include a cell guide support 15 at either side thereof to facilitate the placement and positioning of the cell module within a battery casing (not shown) which is to house a plurality of such cell modules in stacked configuration. Cathode 11 may comprise a continuous hydrophobic membrane, a conductive support screen, and an electro-catalyst layer pressed into and around the support screen, none of these elements being shown in the drawing. The hydrophobic membrane may be polytetrafluoroethylene, and the electrocatalyst layer may be a uniform mixture of platinum bonded with polytetrafluoroethylene particles.

The replaceable anode 20 is adapted to be inserted into the pocket or opening 12 in the envelope cathode 11. In particular, anode 20 includes an upper non-conductive portion 21 which is adapted to seat against the upper surface of non-conductive frame 14, as viewed in FIG. 1, and is suitably fastened to a consumable metal member 22 constituting the anode body which is inserted into the cathode. Portion 21 may be utilized as a handle for ease of insertion and removal of the replaceable anode 20. Alternatively, or in addition, a separate handle 24 may be utilized to facilitate removal of the anode. The anode is preferably completely covered with a porous, non-conductive separator such as glassine paper to electrically insulate it from the envelope cathode 11. A sufficient amount of electrolyte may be added to the envelope pocket to saturate the porous non-conductive separator when the anode is inserted, or the separator may be saturated with the electrolyte prior to insertion of the anode body into the pocket of the envelope cathode.

The non-conductive frame 14 has an opening (not shown) therein to permit the electrical connection of one end of an insulated electrical lead 25 directly to the cathode. Preferably, the opening in the frame is positioned such that the insulated lead 25 projects from an edge of the frame so as not to interfere with the placement of several cell modules in stacked configuration in a battery case. The opening in the frame is sealed and the electrical lead 25 is mechanically fastened to the frame itself, by use of an epoxy resin. At the other end of electrical lead 25 there is electrically attached an electrical connector 27, preferably of the female type, i.e., a receptacle (jack), as shown in the drawing. Connector 27 is constructed and arranged to receive a mating electrical connector as will be described presently. The receptacle is surrounded by a non-conductive body 28 which is preferably composed of the same material as frame 14, such as phenolic.

According to the invention, the frame 14 and the body portion 28 of the connector 27 to which the cathode lead is directly connected are constructed and arranged to undergo mating engagement in such a manner as to allow the body portion to be readily detached at will from the frame. In the embodiment shown in the drawings, this cooperation is achieved by the provision of a dovetail joint configuration, generally designated by reference numeral 30. In particular, the frame 14 is provided with a groove or channel 31 in the shape of a mortise, and the connector body portion 28 is molded or otherwise provided with a mating projecting element or tongue 32 in the form of a tenon. The undercut portions of mortise 31 serve to retain the connector body portion on the frame, while permitting it to be slidably removed from the frame 14 from either side of the cell module. It will be observed that with this construction the connector 28 may readily withstand forces exerted upwardly or downwardly parallel to the edge of the frame without separation from the frame.

An electrical lead (not shown) is electrically connected directly to the anode body 22 and extends through a part of the gripping non-conductive portion 21 where it is electrically connected to a plug or prong constituting a male electrical connector 35 projecting from and embedded in the underside of portion 21 adjacent an end thereof. Prong 35 is constructed and arranged to be received within the mating receptacle 27 when anode body 22 is inserted in pocket 12 of the envelope cathode.

As described in the aforementioned Rosansky et al. application Ser. No. 614,685, now U.S. Patent No. 3,513,030 a redundant wiring system may be and preferably is utilized to virtually eliminate any possibility of battery or cell failure as a result of a loose or broken electrical connection. That is to say, each cell module is provided with a pair of identical electrical connections for both a electrodes, at the two edges of the cell module as shown in the drawings, so that if one connection should be incapacitated the other is still effective to provide a conductive path. This type of redundant wiring system is desirable, but it is not critical to the present invention. Rather, the invention is entirely applicable to cells having only a single connection for each of the anode and the cathode.

When a plurality of cell modules are to be stacked within a battery case, as shown in FIG. 2, the receptacle 27 associated with a cathode of one cell module is slidably fastened to the frame of the next adjacent cell module by the mortise and tenon dovetail joint. Thereby, when the anode for any given cell module is inserted therein and respective connectors 27 and 35 undergo mating engagement, the stacked cells are automatically connected in series circuit, electrically.

Where, as in the past, all cell modules are "hard wired," the presence of a single defective cell among the stacked cells creates a significant problem, particularly where the battery is being used in the field. Either the entire battery must be replaced; or the defective cell must be ferreted out, the entire stack of cells removed from the battery case, and the defective cell replaced by splicing in a new cell module. It will be appreciated that the former solution is wasteful and requires a relatively large inventory of batteries. On the other hand, the latter solution is time-consuming, requires that appropriate tools (for example, soldering tools and wire cutters) be kept on hand, and places the battery out of service for the period during which repair and replacement is being made.

The readily separable mounting between the electrical connector 28 and the frame 14, according to the present invention, positions the connector for automatic electrical connection upon insertion of the anode into the cell module, and conceals all electrical contacts and leads to minimize the danger of inadvertent disruption of the circuit connection between cells during assembly or maintenance procedures on the open battery (FIG. 2). Perhaps more importantly, the detachable mounting permits the replacement of one or more defective cells in the stack in rapid fashion, while the battery is in use in the field. Referring to FIG. 2, showing a cut-away perspective view of a battery comprising a plurality of cells of the type shown in FIG. 1, in stacked configuration within a battery case 40, assume that module 43 is found to be defective and must therefore be replaced. With the cover 45 of the battery case removed, the anode associated with cell module 43 is withdrawn therefrom, thus separating the anode connector from the cathode connector. Similarly, the anode of the next adjacent cell module 46, on which the cathode connector 28 for cell module 43 is separably mounted, must also be removed. In the drawing, the anode for cell module 43 is shown as having been completely removed, and the anode for cell module 46 is shown as being in a state of removal, for the sake of clarity and convenience of explanation. After both anodes have been removed, the cathode connectors 28 mounted on cell modules 43 and 46 are separated from the respective frames of those cell modules, by simply sliding them out, thereby completely freeing cell module 43 from any attachment with or to the remaining cells in the stack. Of course, where a redundant wiring system is used, as shown in the drawings, both cathode connectors of each cell module involved must be detached before the defective cell module is entirely freed. At that point, the defective cell module may simply be withdrawn from its position in the stack and replaced with a new cell module. Appropriate connections are made by a reversal of the procedure of removal of a cell module as described above.

In addition to the advantages of the separable mounting which have heretofore been described, the configuration makes it quite feasible to adapt existing cell modules to a new type of connector, unlike the obsolescence which would occur where the permanent attachment of connector to frame would necessitate virtual destruction of the cell module if a new type of connector were necessary and/or desirable. Moreover, the initial assembly of a plurality of cells into a battery pack is substantially simplified by the separable mounting of connectors according to the present invention.

It should be appreciated that the invention is not to be construed as limited by the illustrated embodiment; rather, obvious variations and modifications may be performed within the skill of the art to provide other embodiments from a consideration of the foregoing description. For example, the description is directed primarily to a metal/air cell utilizing replaceable anodes. The present invention has application, however, where a plurality of unitary cells are connected together for electrical recharging. In such instance it may be desirable to remove an entire cell, i.e., the anode and cathode where the cell as a result of the electrical recharging has become defective. Accordingly, the scope of the invention is to be determined from the following claims.

What is claimed is:

1. A battery comprising a plurality of electrochemical cells each having an envelope cathode for receiving a replaceable anode, said anode including an electrical take-off terminal, sufficient spacing between said anode and cathode for a suitable electrolyte, a non-conducting frame in which said cathode is mounted, connector means electrically connected to said cathode by a flexible lead secured at one end to said frame, said connector means being normally free for movement relative to the cell in consequence of its connection to the other free end of said flexible lead, each of said frame and said connector means including respective mating means for temporarily securing said connector means to said frame in non-conductive relationship therewith, said connector means being mated with said anode take-off terminal whereby anode and cathode of adjacent cells are electrically connected.

2. The battery according to claim 1 wherein said anode has a non-conductive top support member constructed and arranged to seat against said frame when said anode is inserted into said envelope cathode, said non-conductive top support member carrying said anode electrical take-off terminal in fixed relationship therewith for mating electrical engagement with the connector means when temporarily secured to the frame.

3. The battery according to claim 2 wherein said temporarily securing mating means includes a mortise on one of said frame and said connector means, and a tenon on the other of said frame and said connector means for slidable engagement in said mortise, the direction of said slidable engagement being at a sufficient angle to the direction in which the anode is inserted into the envelope cathode to prevent dislodging the connector means from the frame when the electrical connector and the connector means undergo mating engagement.

4. The battery according to claim 1 wherein said connector means includes a non-conductive body portion, and wherein one of said frame and said connector body portion has a projecting element thereon and the other of said frame and said connector body portion has an opening therein to receive and to retain said projecting element absent forceable removal therefrom.

5. The battery according to claim 4 wherein said projecting element is a tenon and said opening is a mortise, to provide a dovetail joint between said frame and said connector body portion.

6. The battery according to claim 5 wherein said mortise and said tenon are oriented, when joined, normal to the direction in which said anode is received within the cell.

References Cited
UNITED STATES PATENTS

| | | | |
|---|---|---|---|
| 944,078 | 12/1909 | Decker | 136—134 |
| 2,132,793 | 10/1938 | Kyle | 136—135 S |
| 2,692,906 | 10/1954 | Morgan | 136—134 |
| 3,338,452 | 8/1967 | Oakley et al. | 136—134 |
| 3,513,030 | 5/1970 | Rosansky et al. | 136—120 |

ALLEN B. CURTIS, Primary Examiner

H. A. FEELEY, Assistant Examiner